(12) United States Patent
Mizobe

(10) Patent No.: US 11,395,393 B2
(45) Date of Patent: Jul. 19, 2022

(54) CHAINED FLASHLIGHT SYSTEM

(71) Applicant: HotaluX, Ltd., Tokyo (JP)

(72) Inventor: Norimasa Mizobe, Tokyo (JP)

(73) Assignee: HotaluX, Ltd., Tokyo (JP)

( * ) Notice: Subject to any disclaimer, the term of this patent is extended or adjusted under 35 U.S.C. 154(b) by 0 days.

(21) Appl. No.: 17/224,301

(22) Filed: Apr. 7, 2021

(65) Prior Publication Data

US 2021/0235565 A1 Jul. 29, 2021

Related U.S. Application Data

(63) Continuation of application No. 16/793,547, filed on Feb. 18, 2020, now Pat. No. 11,006,508, which is a (Continued)

(30) Foreign Application Priority Data

Jan. 27, 2017 (JP) .................................. 2017-012998

(51) Int. Cl.
*H05B 47/18* (2020.01)
*H05B 47/155* (2020.01)
(Continued)

(52) U.S. Cl.
CPC ........... *H05B 47/155* (2020.01); *H05B 47/10* (2020.01); *H05B 47/18* (2020.01); *H05B 47/22* (2020.01); *H05B 47/235* (2020.01)

(58) Field of Classification Search
CPC ...... H05B 47/10; H05B 47/18; H05B 47/155; H05B 47/22; H05B 47/235; H05B 47/20; H05B 47/185
See application file for complete search history.

(56) References Cited

U.S. PATENT DOCUMENTS

| 4,093,937 A | 6/1978 | Habinger |
| 4,291,294 A | 9/1981 | Chase |

(Continued)

FOREIGN PATENT DOCUMENTS

| JP | 03-116681 A | 5/1991 |
| JP | 05-85493 A | 4/1993 |

(Continued)

OTHER PUBLICATIONS

International Search Report for PCT/JP2017/041480, dated Dec. 26, 2017.

*Primary Examiner* — Haissa Philogene
(74) *Attorney, Agent, or Firm* — Sughrue Mion, PLLC

(57) ABSTRACT

A chained flashlight system includes: plural flashlights; plural lighting control devices that control lighting of the plural flashlights, respectively; a communication wire; and a traffic control device. The plural lighting control devices include receiving units, controlling units, activating units, and power supply units, respectively and are coupled to the traffic control device by the communication wire. The traffic control device simultaneously sends an activating signal to the plural lighting control devices via the communication wire. The receiving units receive the activating signal. The controlling units activate the activating units based on a time from reception of the activating signal to activation of the activating units, set for the flashlights, respectively. When the power supply units are turned ON in an activated state of the activating units, respectively, the flashlights are lit by a lighting signal from the traffic control device, respectively.

8 Claims, 2 Drawing Sheets

Related U.S. Application Data continuation of application No. 16/481,336, filed as application No. PCT/JP2017/041480 on Nov. 17, 2017, now Pat. No. 10,609,789.

(51) Int. Cl.
  *H05B 47/21* (2020.01)
  *H05B 47/23* (2020.01)
  *H05B 47/10* (2020.01)

(56) References Cited

U.S. PATENT DOCUMENTS

| | | |
|---|---|---|
| 4,449,073 A | 5/1984 | Mongoven et al. |
| 4,951,046 A | 8/1990 | Lambert et al. |
| 5,926,115 A * | 7/1999 | Schleder ............ H05B 47/235 315/130 |
| 6,305,818 B1 | 10/2001 | Lebens et al. |
| 6,879,263 B2 | 4/2005 | Pederson et al. |
| 6,963,293 B1 * | 11/2005 | Rast ................. G08G 5/065 340/961 |
| 7,180,252 B2 | 2/2007 | Lys |
| 7,740,371 B1 | 3/2010 | Lebens et al. |
| 8,214,061 B2 | 7/2012 | Westrick, Jr. |
| 8,774,622 B2 | 7/2014 | Weintraub et al. |
| 8,827,484 B2 | 9/2014 | Messinger et al. |
| 10,278,268 B2 | 4/2019 | Casey |
| 10,609,789 B2 | 3/2020 | Mizobe |
| 11,006,508 B2 * | 5/2021 | Mizobe ............ H05B 47/22 |
| 2013/0119894 A1 | 5/2013 | Yeh |
| 2019/0367183 A1 | 12/2019 | Mizobe |

FOREIGN PATENT DOCUMENTS

| | | |
|---|---|---|
| JP | 09-301295 A | 11/1997 |
| JP | 2002-362498 A | 12/2002 |
| JP | 2006-085264 A | 3/2006 |
| JP | 2006-156287 A | 6/2006 |
| JP | 2012-003864 A | 1/2012 |

* cited by examiner

CHAINED FLASHLIGHT SYSTEM

CROSS REFERENCE TO RELATED APPLICATIONS

This application is a Continuation of U.S. application Ser. No. 16/793,547 filed Feb. 18, 2020, which is a Continuation of U.S. application Ser. No. 16/481,336 filed Jul. 26, 2019, which is a National Stage of International Application No. PCT/JP2017/041480 filed Nov. 17, 2017, claiming priority based on Japanese Application No. 2017-012998 filed Jan. 27, 2017, the contents of which are incorporated herein by reference in their entirety.

TECHNICAL FIELD

The present invention relates to a chained flashlight system.

BACKGROUND ART

In the existing chained flashlight systems used in Japanese airports, for example, 29 flashlights (hereinafter also referred to as "lamps") are repeatedly activated sequentially from one end of a runway to the other end at about 17 milliseconds per one lamp (0.5 seconds per one cycle), and a lighting signal is directly sent from the traffic controller (traffic control device) to each lamp. Therefore, many communication wires are used between the controller and each lamp (Patent Literatures 1 and 2).

CITATION LIST

Patent Literature

Patent Literature 1: JP H05-085493 A
Patent Literature 2: JP H03-116681 A

SUMMARY OF INVENTION

Technical Problem

In the chained flashlight system, for example, large-capacity capacitors are charged (electricity is accumulated in large-capacity capacitors) to simultaneously start multiple flashlights having high brightness.

However, the capacitors are charged in parallel. Thus, there are problems of large rush current applied to the capacitors at start-up of charging and a load applied on a power supply device and a power supply wire.

Hence, it is an object of the present invention to provide a chained flashlight system capable of reducing a load on a power supply wire and a power supply.

Solution to Problem

In order to achieve the aforementioned object, according to the present invention there is provided a chained flashlight system which includes: plural flashlights; plural lighting control devices that control lighting of the respective flashlights, a communication wire; and a traffic control device. In the chained flashlight system, each lighting control device includes: a receiving unit; a controlling unit; an activating unit; and a power supply unit. The plural lighting control devices are coupled to the traffic control device by the communication wire. The traffic control device simultaneously sends an activating signal to the plural lighting control devices via the communication wire. The receiving unit of each of the plural lighting control devices receives the activating signal. The controlling unit of each of the plural lighting control devices activates the corresponding activating unit. When the power supply unit of each of the plural lighting control devices is turned ON in an activated state of the corresponding activating unit, the corresponding flashlight is lit by a lighting signal sent either simultaneously or at different times from the traffic control device. Each of the plural lighting control devices further includes an abnormality sensing unit. The abnormality sensing unit of each of the plural lighting control devices detects an abnormality of at least one unit selected from the group consisting the corresponding flashlight, the corresponding receiving unit, the corresponding controlling unit, the corresponding activating unit, and the corresponding power supply unit and sends an abnormal signal to the traffic control device via the communication wire.

Advantageous Effects of Invention

The present invention can provide a chained flashlight system capable of reducing a load on a power supply wire and a power supply.

DESCRIPTION OF EMBODIMENTS

Figure 1:
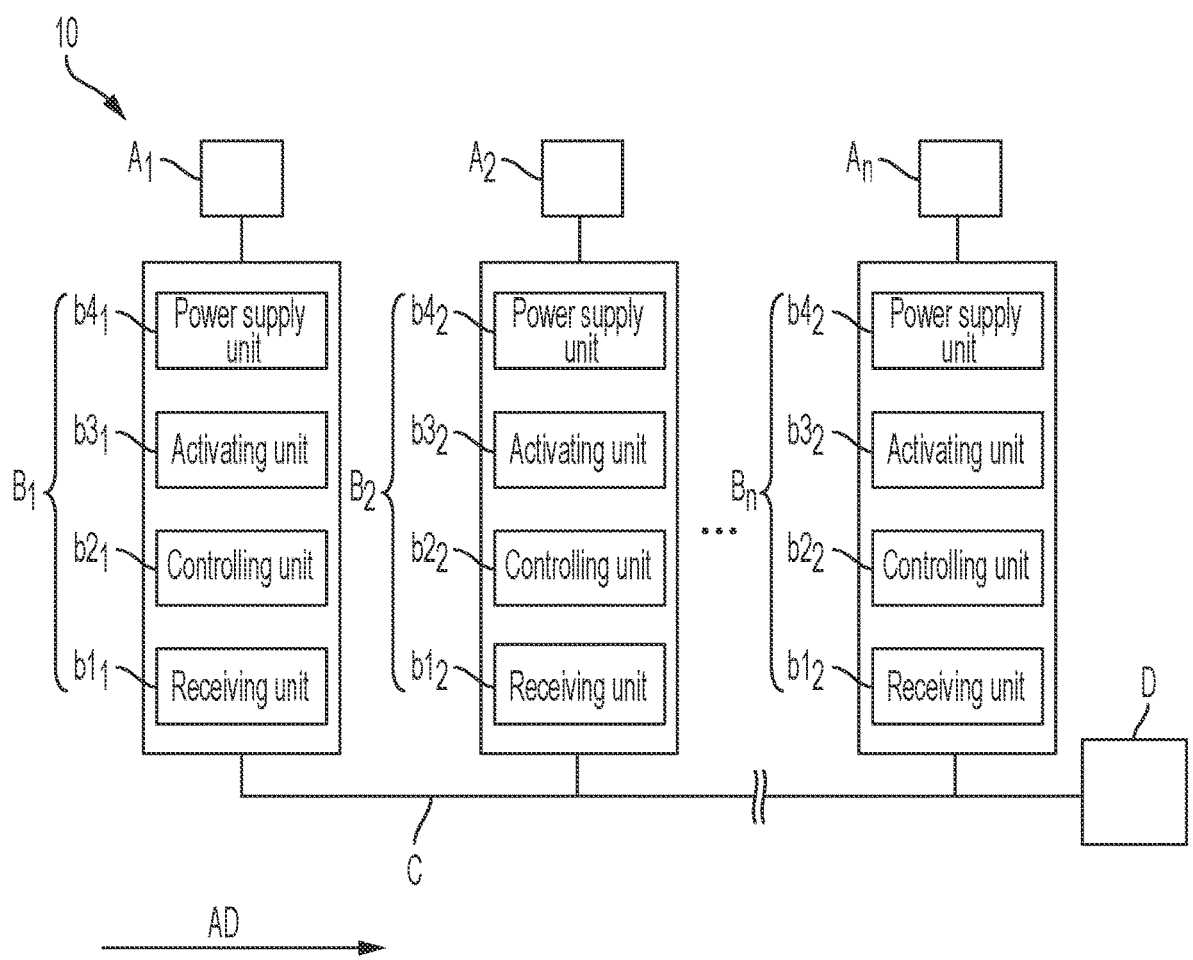
FIG. 1 is a block diagram illustrating an example configuration of a chained flashlight system according to a first embodiment.

The chained flashlight system of the present invention is configured such that, for example, the controlling unit of each lighting control device turns on the corresponding power supply unit in an activated state of the corresponding activating unit on the basis of the lighting signal from the traffic control device.

The chained flashlight system of the present invention is configured such that, for example, the traffic control device simultaneously sends a lighting signal to the lighting control devices via the communication wire.

The chained flashlight system of the present invention is configured such that, for example, the controlling unit of each lighting control device turns ON the corresponding power supply unit on the basis of a time condition from reception of the lighting signal to turning ON of the power supply device, set for the corresponding flashlight, in an activated state of the corresponding activating unit.

The chained flashlight system of the present invention is configured such that, for example, the communication wire is capable of sending the lighting signal from the traffic control device to the lighting control devices and is a bidirectional communication wire capable of feeding back information from the lighting control device to the traffic control device, and the lighting control devices are coupled to the traffic control device by the communication wire.

The chained flashlight system of the present invention is configured such that, for example, it further includes a power supply device and a power supply wire, and the lighting control devices are coupled to the power supply device by the same power supply wire. The power supply wire is, for example, of a single-phase two-wire type.

The chained flashlight system of the present invention is configured such that, for example, flashlights are LED flashlights.

The chained flashlight system of the present invention is configured such that, for example, the traffic control device further simultaneously sends a luminous intensity designation signal to the lighting control devices via the communication wire, the receiving unit of each lighting control device receives the luminous intensity designation signal, the controlling unit of each lighting control device turns ON the corresponding power supply unit such that luminous intensity of the corresponding flashlight during an ON-state of the power supply unit becomes luminous intensity specified by the luminous intensity designation signal, and when the power supply unit of each lighting control device is turned ON, the corresponding flashlight is lit so as to have the luminous intensity specified by the luminous intensity designation signal.

The chained flashlight system of the present invention is configured such that, for example, each lighting control device further includes an abnormality sensing unit, the abnormality sensing unit of each lighting control device detects an abnormality of at least one unit selected from the group consisting the corresponding flashlight, the corresponding receiving unit, the corresponding controlling unit, the corresponding activating unit, and the corresponding power supply unit and sends an abnormal signal to the traffic control device via the communication wire.

The chained flashlight system of the present invention is configured such that, for example, each flashlight further includes a heater, the chained flashlight system further includes heater control devices that control heating of the respective flashlights, each heater control device includes: a heater receiving unit; a heater controlling unit; and a heater power supply unit, the lighting control devices are coupled to the traffic control device by the same communication wire, the traffic control device simultaneously sends a heating signal to the heater control devices via the communication wire, the heater receiving unit of each heater control device receives the heating signal, the heater controlling unit of each heater control device turns ON the corresponding heater power supply unit, and when the heater power supply unit of each heater control device is turned ON, the corresponding heater of the flashlight is turned on.

The chained flashlight system of the present invention is configured such that, for example, the traffic control device sends 1-bit information in the activating signal for a predetermined pulse signal width. The predetermined pulse signal width is preferably 0.1 to 499.9 milliseconds.

Now, description will be made as regards the chained flashlight system of the present invention in details with reference to the drawings. However, the present invention is not limited to the following description. Note here that there may be cases where the same reference numerals are given to the same components in FIGS. 1 and 2 below, and descriptions thereof are omitted. Furthermore, in the drawings, for ease of description, illustration of the structures of the components may be simplified as appropriate, and the ratio of sizes of components and the like may be schematically indicated contrary to reality.

First Embodiment

FIG. 1 is a block diagram illustrating an example configuration of the chained flashlight system (hereinafter also referred to as "system") according to the present embodiment. As shown in FIG. 1, a system 10 according to the present embodiment includes flashlights $A_1$ to $A_n$, lighting control devices $B_1$ to $B_n$, a communication wire C, and a traffic control device D, and the lighting control devices $B_1$ to $B_n$ include receiving units $b1_1$ to $b1_n$, controlling units $b2_1$ to $b2_n$, activating units $b3_1$ to $b3_n$, and power supply units $b4_1$ to $b4_n$, respectively. In the system 10 according to the present embodiment, the flashlights $A_1$ to $A_n$ are coupled (hereinafter also referred to as "connected") to the lighting control devices $B_1$ to $B_n$, respectively. The lighting control devices $B_1$ to $B_n$ are connected to the traffic control device D by the same communication wire C. Although not shown, in the system 10 according to the present embodiment, in order to guide an aircraft to a runway, the flashlights $A_1$ to $A_n$ are arranged linearly such that the flashlight $A_1$ is arranged at an end on the side opposite to an approach direction for the aircraft relative to an end at an approach entrance for the aircraft in the runway, and the flashlight $A_n$ is arranged at the end on the approach entrance side of the runway. In FIG. 1, an arrow AD indicates an approach direction for the aircraft.

The flashlights $A_1$ to $A_n$ may be any lamps capable of emitting flashes, and known flashlights can be used. Specific examples thereof include as xenon light (xenon flashlight), an LED light (LED flashlight), and the like, and the LED light is preferable because it can reduce power consumption. The number n of sets based on one set of a flashlight and a lighting control device corresponding to the flashlight in the system 10 according to the present embodiment is an integer of 3 or more. However, the number n of sets may be an integer of 2 or more and can be set, as appropriate, according to the number of sets of flashlights in the chained flashlights, for example. Specifically, the number n of sets is, for example, 2 to 30, and is, for example, 29 in Japan. Moreover, in each set, the number of flashlights $A_n$ connected to the lighting control device $B_n$ is not particularly limited and is, for example, one. The flashlights $A_1$ to $A_n$ may have address information Ian which can specify the flashlights $A_1$ to $A_n$, for example.

The lighting control devices $B_1$ to $B_n$ control lighting of the flashlights $A_1$ to $A_n$ respectively. In the system 10 according to the present embodiment, the lighting control devices $B_1$ to $B_n$ have the receiving units $b1_1$ to $b1_n$, the controlling units $b2_1$ to $b2_n$, the activating units $b3_1$ to $b3_n$, and the power supply units $b4_1$ to $b4_n$, respectively and may further include other units, specifically the respective abnormality sensing units to be described below. The lighting control devices $B_1$ to $B_n$ may have address information $Ib_n$ which can specify the lighting control devices $B_1$ to $B_n$, for example.

The receiving units $b1_1$ to $b1_n$ receive a lighting signal. As each of the receiving units $b1_1$ to $b1_n$, a receiver capable of receiving an analog signal or a digital signal according to the type of the signal sent by the traffic control device D can be used, and specific examples of the receiver include an analog signal receiver and a digital signal receiver. When the receiving units $b1_1$ to $b1_n$ are analog signal receivers, they preferably include the respective digital-to-analog converters. The receiving units $b1_1$ to $b1_n$ may further have a sending function of being capable of sending information and the like on the lighting control devices $B_1$ to $B_n$. In this case, the receiving units $b1_1$ to $b1_n$ can also be referred to as, for example, sending/receiving units. The information can be, for example, an abnormal signal to be described below. When the receiving units $b1_1$ to $b1_n$ have a sending function and send the information to the traffic control device D by the analog signal, they preferably include the respective digital-to-analog converters. The lighting signal is, for example, a signal for instructing the flashlights $A_1$ to $A_n$ to emit flashes. If the flashlights $A_1$ to $A_n$ are lamps, such as LED lights or the like, that continue to be lit once they are lit, the lighting signal preferably includes at least one of a signal relating to the lighting time of the flashlights $A_1$ to $A_n$ or an extinguishing signal for turning OFF the flashlights $A_1$ to $A_n$ after the elapse of the lighting time. The lighting time is, for example, 0.01 to 50 milliseconds.

The controlling units $b2_1$ to $b2_n$ activate the activating units $b3_1$ to $b3_n$ on the basis of the time condition (hereinafter also referred to as the "activation condition") from the reception of the activating signal to the activation of the activating units $b3_1$ to $b3_n$, set for the flashlights $A_1$ to $A_n$, respectively. The controlling units $b2_1$ to $b2_n$ may be any devices capable of activating the activating units $b3_1$ to $b3_n$, respectively, and examples thereof include a CPU (Central Processing Unit), a microprocessor, and a microcontroller. The activation condition can be any condition where a load on a power supply wire and a power supply device connected to the system 10 according to the first embodiment can be reduced. Specifically, the activation condition is preferably a time condition where all of the activating units $b3_1$ to $b3_n$ are not activated simultaneously after reception of the activating signal or a time condition where the activating units $b3_1$ to $b3_n$ are activated at different times. In the latter case, the activation condition can be a time condition where the activating units $b3_1$ to $b3_n$ are activated sequentially at a predetermined time interval $T_s$ from the activating unit $b3_1$ toward the activating unit $b3_n$. In this case, the activation condition is, for example, a time condition where the controlling unit $b2_n$ activates the activating unit $b3_n$ after the elapse of $T_s \times n$ seconds from the reception of the activating signal. The predetermined time interval $T_s$ is, for example, 10 to 200 milliseconds, 100 milliseconds. The predetermined time interval $T_s$ may be set considering a time lag occurring until the lighting control devices $B_1$ to $B_n$ receive the activating signal sent simultaneously, for example.

When the power supply units $b4_1$ to $b4_n$ are turned ON in an activated state of the activating units $b3_1$ to $b3_n$, respectively, the flashlights $A_1$ to $A_n$ are lit by a lighting signal from the traffic control device D, respectively. The power supply units $b4_1$ to $b4_n$ may be any means capable of lighting the respective flashlights $A_1$ to $A_n$, and known voltage-applying means may be used, for example. When the flashlights $A_1$ to $A_n$ are xenon lights, the power supply units $b4_1$ to $b4_n$ preferably further send a trigger signal for causing the flashlights $A_1$ to $A_n$ to emit light. The power supply units $b4_1$ to $b4_n$ may further include the respective known electric accumulation means such as condensers (capacitors) to stabilize luminous intensity of the flashlights $A_1$ to $A_n$, for example. When the power supply units $b4_1$ to $b4_n$ include the respective electric accumulation means, the power supply units $b4_1$ to $b4_n$ turn ON the respective flashlights $A_1$ to $A_n$ by supplying electric power in the electric accumulation means to the respective flashlights $A_1$ to $A_n$, for example. In this case, the power supply units $b4_1$ to $b4_n$ preferably start up charging at the same timing as activation of the activating units $b3_1$ to $b3_n$ to reduce a rush current applied to an electric accumulation mean at the start-up of charging and further reduce a load on a power supply wire and a power supply device connected to the system 10 according to the present embodiment.

The communication wire C may be any communication wire capable of communicating data, and a known communication wire can be used. Specific examples of the communication wire C include a metal communication cable and an optical fiber communication cable. The communication wire C is preferably a metal communication cable because it is easy to attach and detach. In the system 10 according to the present embodiment, the communication wire C is connected to the lighting control devices $B_1$ to $B_n$ in bus topology because it is easy to use the existing communication wire C, for example. However, the communication wire C may be connected to the lighting control devices $B_1$ to $B_n$ in other topology, such as star topology, ring topology, mesh topology, tree topology, serial topology, or the like. It is preferred that the lighting control devices $B_1$ to $B_n$ are connected to one another with the common (same) communication wire C such as in bus topology, serial topology, or the like because it is easy to use the existing communication wire C, for example. The lighting control devices $B_1$ to $B_n$ may be connected to one another with a different communication wire C as a substitute for the same communication wire C. In the system 10 according to the present embodiment, the communication wire C functions as a communication wire for sending an activating signal from the traffic control device D to the lighting control devices $B_1$ to $B_n$. Therefore, the communication wire C can also be referred to as an input communication wire, for example. The number of communication wires C is not particularly limited and may be, for example, one or two or more. In the latter case, one of the two or more communication wires may be used as an input communication wire, and the other one may be used as an output communication wire for feeding information back from the lighting control devices $B_1$ to $B_n$ to the traffic control device D.

The traffic control device D simultaneously sends an activating signal to the lighting control devices $B_1$ to $B_n$ via the communication wire C. The traffic control device D may be a device capable of generating the activating signal and can be, for example, a CPU, a microprocessor, or a microcontroller. The traffic control device D further sends a lighting signal in addition to the activating signal. The traffic control device D may simultaneously sends the lighting signal to the lighting control devices $B_1$ to $B_n$ via the communication wire C or may send an activating signal to some or all of the lighting control devices $B_1$ to $B_n$ at different times, for example.

Next, a method for lighting the flashlights $A_1$ to $A_n$ using the system 10 according to the present embodiment will be described.

First, the traffic control device D simultaneously sends an activating signal to the lighting control devices $B_1$ to $B_n$ via the communication wire C. The number of times of sending the activating signal from the traffic control device D may be one or multiple times, and however, the former is preferable. In the former case, the traffic control device D sends the activating signal once prior to the sending of one lighting signal or a set of lighting signals to be mentioned below, for example.

Next, the receiving units $b1_1$ to $b1_n$ of the lighting control devices $B_1$ to $B_n$ receive the activating signal sent by the traffic control device D. The controlling units $b2_1$ to $b2_n$ activate the activating units $b3_1$ to $b3_n$ on the basis of the time condition from the reception of the activating signal to the activation of the activating units $b3_1$ to $b3_n$, set for the flashlights $A_1$ to $A_n$, respectively. As a specific example, the activation condition for the controlling unit $b2_n$ is a time condition where the activating unit $b3_n$ is activated after the elapse of $T_s \times n$ seconds from the reception of the activating signal, and when the predetermined time $T_s$ is 0.1 seconds, the activating units $b3_1$, $b3_2$, [ . . . ], and $b3_n$ are activated after about 0.1 seconds, about 0.2 seconds, [ . . . ], and about $0.1 \times n$ seconds, respectively.

Further, the traffic control device D sends a lighting signal to the lighting control devices $B_1$ to $B_n$ via the communication wire C. The traffic control device D may simultaneously sends the lighting signal or may sends the lighting signal at different times, for example. When the lighting signal simultaneously sends the lighting signal, the flashlights $A_1$ to $A_n$ are sequentially lit by the lighting control devices $B_1$ to $B_n$, for example. When the lighting signal is sent at different times, the traffic control device D sends the lighting signal such that the flashlights $A_1$ to $A_n$ are lit sequentially, for example. The flashlights $A_1$ to $A_n$ are arranged linearly such that the flashlight $A_1$ is arranged at an end on the side opposite to an approach direction for the aircraft relative to an end at an approach entrance for the aircraft in the runway, and the flashlight $A_n$ is arranged at the end on the approach entrance side of the runway. Therefore, in the case where a pilot of the aircraft sees the flashlights $A_1$ to $A_n$, the flashlights $A_1$ to $A_n$ are lit sequentially along an approach direction for the aircraft (an direction indicated by the arrow AD).

As described above, in the system 10 according to the present embodiment, all of the lighting control devices $B_1$ to $B_n$ are not simultaneously activated under the activation condition. Thus, the rush current generated at activation of the lighting control devices $B_1$ to $B_n$ is reduced as compared with the case where all of the lighting control devices $B_1$ to $B_n$ are activated simultaneously. Therefore, a load on the power supply device and the power supply wire connected to the system 10 according to the present embodiment can be reduced. Moreover, since the system 10 according to the present embodiment can reduce a load on the power supply device and the power supply wire, the power supply device and the power supply wire can be simplified and can be installed at low cost as compared with the case of the system where all of the lighting control devices $B_1$ to $B_n$ are activated simultaneously, for example.

For example, in the system 10 according to the present embodiment, the controlling units $b2_1$ to $b2_n$ of the lighting control devices $B_1$ to $B_n$ may turn On the power supply units $b4_1$ to $b4_n$ on the basis of the lighting signal from the traffic control device D in an activated state of the activating units $b3_1$ to $b3_n$, respectively. As described above, when the controlling units $b2_1$ to $b2_n$ control turning ON of the power supply units $b4_1$ and $b4_n$, sequential lighting of the flashlights $A_1$ to $A_n$ can be performed more easily. Moreover, in this case, for example, the controlling units $b2_1$ to $b2_n$ are preferably combined with the controlling units $b2_1$ to $b2_n$ having a time condition until turning ON to be mentioned below to sequentially light the flashlights $A_1$ to $A_n$ more easily.

In the system 10 according to the present embodiment, the traffic control device D may simultaneously sends a lighting signal to the lighting control devices $B_1$ to $B_n$ via the communication wire C. Moreover, in this case, for example, the traffic control device D is preferably combined with the controlling units $b2_1$ to $b2_n$ having a time condition until turning ON to be mentioned below to sequentially light the flashlights $A_1$ to $A_n$ more easily.

For example, in the system 10 according to the present embodiment, the controlling units $b2_1$ to $b2_n$ of the lighting control devices $B_1$ to $B_n$ turn ON the power supply units $b4_1$ to $b4_n$, respectively, on the basis of the time condition (hereinafter also referred to as the "power ON condition") from the reception of the lighting signal to the turning ON of the power supply units $b4_1$ to $b4_n$, set for the respective flashlights $A_1$ to $A_n$ in an activated state of the activating units $b3_1$ to $b3_n$. The controlling units $b2_1$ to $b2_n$ may be any devices capable of turning ON the power supply units $b4_1$ to $b4_n$, respectively, and examples thereof include a CPU, a microprocessor, and a microcontroller. The power ON condition is preferably a time condition where the flashlights $A_1$ to $A_n$ are lit sequentially at a predetermined time interval $T_p$ in order from the flashlight $A_1$ to the flashlight $A_n$. As a specific example, the time condition for the controlling unit $b2_n$ is a time condition where the power supply unit $b4_n$ is turned ON after the elapse of $T_p \times n$ seconds from the reception of the lighting signal. The predetermined time interval $T_p$ is, for example, a time interval specified by the International Standards and is specifically about 17 milliseconds, for example. The predetermined time interval $T_p$ may be set considering a time lag T occurring until the lighting control devices $B_1$ to $B_n$ receive the lighting signal sent simultaneously, for example. If the flashlights $A_1$ to $A_n$ are LED lights, and the lighting signal includes at least one of a signal relating to the lighting time of the flashlights $A_1$ to $A_n$ or an extinguishing signal for turning OFF the flashlights $A_1$ to $A_n$ after the elapse of the lighting time, the controlling units $b2_1$ to $b2_n$ preferably turn OFF the power supply units $b4_1$ to $b4_n$ on the basis of the signal relating to the lighting time or the extinguishing signal. The system 10 according to the present embodiment has the power ON condition. The flashlights $A_1$ to $A_n$ are thus lit after the reception of the lighting signal sent by the traffic control device D on the basis of the time condition for the controlling units $b2_1$ to $b2_n$ of the lighting control devices $B_1$ to $B_n$. Therefore, the traffic control device D is not required to send a different lighting signal to each lighting control device. Accordingly, a communication wire for each lighting control device is not required to be provided. Therefore, the system 10 according to the present embodiment having the power ON condition is not required to provide a communication wire for each lighting control device, and a communication wire thus can be provided at low cost. In addition, the system 10 according to the present embodiment having the power ON condition can reduce the number of existing communication wires to, for example, one while using the existing communication wire, by connecting one of the existing communication wires to all lighting control devices $B_1$ to $B_n$, for example.

The system 10 according to the present embodiment may include, for example, a communication wire. In this case, in the system 10 according to the present embodiment, it is preferred that the communication wires are bidirectionally communicable wires that can send a lighting signal from the traffic control device to the lighting control devices and can feed information back from the lighting control devices to the traffic control device, and the lighting control devices are coupled to the traffic control device. The lighting control devices are preferably coupled to the traffic control device by the same communication wire, for example. The communication wire may be, for example, a pair of communication wires. In this case, one of the communication wires is an input communication wire for sending a lighting signal from the traffic control device to the lighting control devices, and the other communication wire is an output communication wire for feeding information back from the lighting control devices to the traffic control device, and the lighting control devices are preferably coupled to the traffic control device by the same output communication wire. Between the pair of communication wires, one can also be referred to as a (+) wire, and the other can also be referred a (−) wire, for example. The input communication wire and the output communication wire can be described with reference to the description of the above-mentioned communication wire, for example. With the bidirectionally communicable communication wire or the output communication wire, information of an abnormal signal to be described below can be fed back to the traffic control device, for example. Accordingly, for example, statuses of the flashlights $A_1$ to $A_n$ and the lighting control devices $B_1$ to $B_n$ can be monitored, and they can be maintained at an appropriate time.

The system 10 according to the present embodiment further includes, for example, a power supply device and a power supply wire, and the lighting control devices are coupled to the power supply device by the same power supply wire. The power supply device may supply electric power to the flashlights and the lighting control devices via the power supply wire, and a known power supply can be used, for example. The power supply wire is not particularly limited, and a known electric wire can be used. The type of the power supply wire is not particularly limited, and can be determined, as appropriate, according to a power distribution system. The type can be, for example, a single-phase two-wire type, a single-phase three-wire type, or a three-phase three-wire type and is preferably a single-phase two-wire type because wiring is easy, and installation can be performed inexpensively. In the existing chained flashlight system, single-phase three-wire type is mainly used. However, since the system 10 according to the present embodiment can reduce a load on the power supply device and the power supply wire connected to the system 10 according to the present embodiment as mentioned above, a single-phase two-sire type can also be used in the system 10 according to the present embodiment, for example.

The system 10 according to the present embodiment is preferably configured such that, for example, the traffic control device D simultaneously sends a luminous intensity designation signal to the lighting control devices $B_1$ to $B_n$ via the communication wire C, the receiving units $b1_1$ to $b1_n$ of the lighting control devices $B_1$ to $B_n$ receive the luminous intensity designation signal, the controlling units $b2_1$ to $b2_n$ of the lighting control devices $B_1$ to $B_n$ turn ON the power supply units $b4_1$ to $b4_n$, respectively, such that the luminous intensity of the flashlights $A_1$ to $A_n$ during the ON-state of the power supply units $b4_1$ to $b4_n$ becomes luminous intensity specified by the luminous intensity designation signal, and when the power supply units $b4_1$ to $b4_n$ of the lighting control devices $B_1$ to $B_n$ are turned ON, the flashlights $A_1$ to $A_n$ are activated, respectively, so as to have luminous intensity specified by the luminous intensity designation signal. The luminous intensity of the flashlights $A_1$ to $A_n$ during the ON state, specified by the luminous intensity designation signal, is, for example, a peak luminous intensity of the flashlights $A_1$ to $A_n$ after turning ON of the power supply units $b4_1$ to $b4_n$. The luminous intensity designation signal may be, for example, a signal designating a numerical value of a specific luminous intensity or a signal designating a luminous intensity set in advance. The luminous intensity set in advance is not particularly limited and can be, for example, high lighting (e.g., 6000 to 20000 cd), medium lighting (e.g., 600 to 2000 cd), or low lighting (e.g., 100 to 450 cd). As described above, in the case where the luminous intensity designation signal is a signal designating a luminous intensity set in advance, for example, the luminous intensity may be set such that when the traffic control device D sends the lighting signal, the flashlights $A_1$ to $A_n$ emit flashes with a luminous intensity of high lighting, and when the traffic control device D sends the luminous intensity designation signal, the flashlights $A_1$ to $A_n$ emit flashes with a luminous intensity of medium lighting or low lighting. The system 10 according to the present embodiment can adjust the luminous intensity of the flashlights $A_1$ to $A_n$ to be appropriate depending on the different circumstances of the ambient brightness such as, for example, in the morning, day, evening, night, etc., by allowing the traffic control device D to send the luminous intensity designation signal. The pilot of the aircraft thus can more clearly recognize the flashes of the flashlights $A_1$ to $A_n$.

In the system 10 according to the present embodiment, the lighting control devices $B_1$ to $B_n$ preferably further include the respective abnormality sensing units, for example. In this case, it is preferred that the abnormality sensing units of the lighting control devices $B_1$ to $B_n$ detect an abnormality of at least one unit selected from the group consisting of the flashlights $A_1$ to $A_n$, the receiving units $b1_1$ to $b1_n$, the controlling units $b2_1$ to $b2_n$, the activating units $b3_1$ to $b3_n$, and the power supply units $b4_1$ to $b4_n$ and send an abnormal signal to the traffic control device D via the communication wire. In the case where the communication wire is a pair of communication wires, the abnormality sensing units preferably send an abnormal signal to the traffic control device D via the output communication wire, for example. The abnormality sensing units can be determined, as appropriate, according to, for example, the type of the flashlights $A_1$ to $A_n$, the receiving units $b1_1$ to $b1_n$, the controlling units $b2_1$ to $b2_n$, the activating units $b3_1$ to $b3_n$, and the power supply units $b4_1$ to $b4_n$ and can be means for sensing voltages, currents, and the like of the respective units. Since the abnormality sensing units can easily specify a flashlight and a unit with abnormalities, address information $Ia_n$ of the flashlights $A_1$ to $A_n$ or address information $Ib_n$ of the lighting control devices $B_1$ to $B_n$ may also be sent to the abnormality sensing units, for example. Abnormalities of the flashlights $A_1$ to $A_n$ and each unit may be, for example, abnormalities of the flashlights $A_1$ to $A_n$ and each unit themselves or abnormalities such as breakage of wire in the connection of the flashlights $A_1$ to $A_n$ and each unit to other units. In the case where the number of communication wires C is one, the abnormality sensing units may send an abnormal signal via one communication wire C as a substitute for the output communication wire, for example. With the abnormality sensing units, the abnormal signal can be fed bad to the traffic control device. Accordingly, for example, abnormalities of the flashlights $A_1$ to $A_n$ and the lighting control devices $B_1$ to $B_n$ can be monitored, and they can be maintained at an appropriate time.

In the system 10 according to the present embodiment, the flashlights $A_1$ to $A_n$ preferably further include the respective heaters, for example. Each heater is not particularly limited, and a known heater can be used. In the case where the flashlights $A_1$ to $A_n$ in the system 10 according to the present embodiment include the respective heaters, it is preferable that the system 10 according to the present embodiment includes heater control devices that correspond to the flashlights $A_1$ to $A_n$, respectively, and control the respective heaters of the flashlights $A_1$ to $A_n$, and each heater control device includes a heater receiving unit, a heater controlling unit, and a heater power supply unit, the heater control devices are coupled to the traffic control device D by the same communication wire, the traffic control device D simultaneously sends a heating signal to the heater control devices via the communication wire, the heater receiving unit of each heater control device receives the heating signal, the heater controlling unit of each heater control device turns ON the corresponding heater power supply unit, and the heaters of the flashlights $A_1$ to $A_n$ are lit by turning ON the respective heater power supply units of the heater control devices. Specific examples of the heater receiving unit, the heater controlling unit, and the heater power supply unit can be described with reference to the description of the specific examples of the receiving units $b1_1$ to $b1_n$, the controlling units $b2_1$ to $b2_n$, and the power supply units $b4_1$ to $b4_n$, for example. Any one or two or more units among the receiving units $b1_1$ to $b1_n$, the controlling units $b2_1$ to $b2_n$, and the power supply units $b4_1$ to $b4_n$ may also have a function of the heater receiving unit, the heater controlling unit, and the heater power supply unit, for example. The communication wire C may also serve as a communication wire for sending the heating signal. When the flashlights $A_1$ to $A_n$ include the respective heaters, snow and ice on the flashlights $A_1$ to $A_n$ can be melted in cold climate areas where snow falls or freeze occurs, for example. Therefore, for example, a reduction in luminous intensity of the flashlights $A_1$ to $A_n$ can be prevented, and the pilot of the aircraft can more clearly recognize the flashes of the flashlights $A_1$ to $A_n$.

In the system 10 according to the present embodiment, the traffic control device D sends 1-bit information in the activating signal for a predetermined pulse signal width, for example. The predetermined pulse signal width is, for example, 0.1 to 499.9 milliseconds. As a specific example, the activating signal is 256-bit information, and when the activating signal is sent as one or more signals, the traffic control device D sends 1-bit information for the first time and thereafter sends the remaining 255-bit information by 1 bit at a predetermined time interval, for example. The predetermined time interval is, for example, 0.2 to 1.95 milliseconds. The predetermined time interval is, for example, the time required to send (n+1)th 1-bit information in the activating signal from the time at which n-th 1-bit information of the activating signal is sent. The predetermined time interval is preferably constant. The proportion of the signal width (pulse width) during which 1-bit information is sent in each interval is not particularly limited. The proportion is, for example, 50% to 90%. The traffic control device D may send 1-bit information in the lighting signal for a predetermined pulse signal width in addition to or as a substitute for the activating signal. When the system 10 according to the present embodiment can specify the luminous intensity, the traffic control device D may send 1-bit information in the luminous intensity designation signal for a predetermined pulse signal width in addition to or as a substitute for the activating signal. When the system 10 according to the present embodiment includes the heaters, the traffic control device D may send 1-bit information in the heating signal for a predetermined pulse signal width in addition to or as a substitute for the activating signal. When the system 10 according to the present embodiment includes the abnormality sensing units, the traffic control device D may receive 1-bit information in the abnormal signal sent by the abnormality sensing units for a predetermined pulse signal width. In this case, the abnormality sensing units may send 1-bit information in the abnormal signal for a predetermined pulse signal width. The predetermined pulse signal widths for the lighting signal, the luminous intensity designation signal, the heating signal, and the abnormal signal can be described with reference to the descriptions of the predetermined pulse signal width for the lighting signal by reading the "activating signal" as the "lighting signal", the "luminous intensity designation signal", the "heating signal", or the "abnormal signal", for example. As described above, when the traffic control device D sends or receives 1-bit information in each signal for a predetermined pulse signal width, an influence of a noise that may be contained in each signal by surge or the like can be reduced, for example. Therefore, the system 10 including the traffic control device D that sends or receives 1-bit information in each signal for a predetermined pulse signal width is excellent in resistance to noise and signal deterioration, for example. Accordingly, as a communication wire C, a communication wire that is not an optical fiber communication cable or a communication wire that does not include a shielding wire, i.e., an existing communication wire can be used. Furthermore, by setting the proportion of the signal width to the above-mentioned proportion, the resistance to noise can further be improved, and deterioration of each signal can further be prevented, for example.

Second Embodiment

Figure 2:
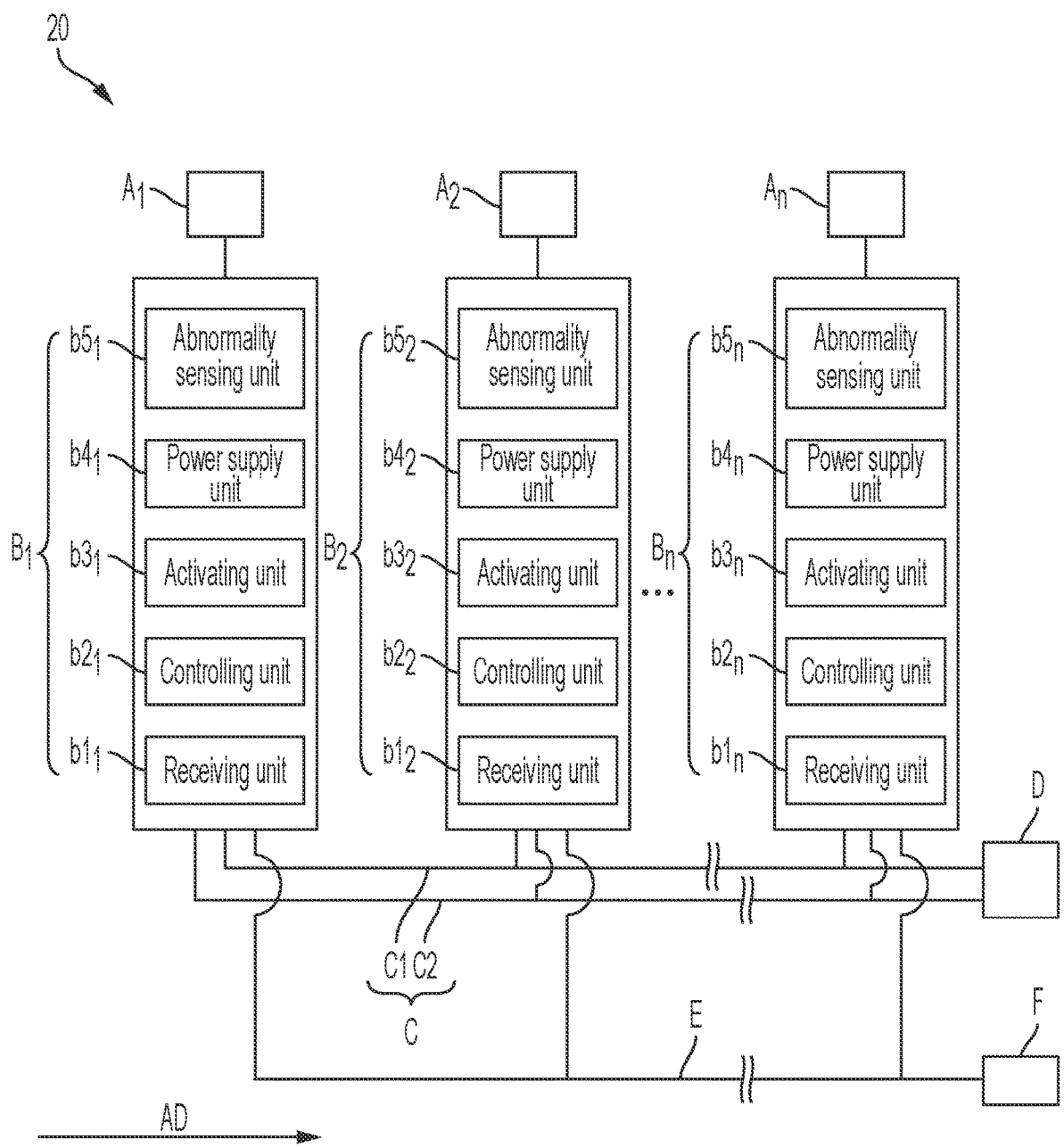
FIG. 2 is a block diagram illustrating an example configuration of a chained flashlight system according to a second embodiment.

The second embodiment is another example of the chained flashlight system including a pair of communication wires, the power supply devices, the power supply devices, and the abnormality sensing units. FIG. 2 shows an example configuration of a chained flashlight system 20 according to the present embodiment. As shown in FIG. 2, the system 20 according to the present embodiment is configured such that the system 10 according to the first embodiment includes a pair of communication wires C as a substitute for a communication wire C1, and a pair of communication wires C2 includes an input communication wire and an output communication wire, and the lighting control devices $B_1$ to $B_n$ include abnormality sensing units $b5_1$ to $b5_n$, respectively. The lighting control devices $B_1$ to $B_n$ are connected to the traffic control device D by the same input communication wire C1 and the same output communication wire C2. The system 20 according to the present embodiment further includes a power supply wire E and a power supply device F, and the lighting control devices are coupled to the power supply device F by the same power supply wire E. In the system 20 according to the present embodiment, the controlling units $b2_1$ to $b2_n$ of the lighting control devices $B_1$ to $B_n$ turn ON the power supply units $b4_1$ to $b4_n$, respectively, on the basis of the time condition from the reception of the lighting signal to the turning ON of the power supply units $b4_1$ to $b4_n$, set for the respective flashlights $A_1$ to $A_n$ in an activated state of the activating units $b3_1$ to $b3_n$, and the traffic control device D simultaneously sends the lighting signal to the lighting control devices $B_1$ to $B_n$ via the input communication wire C1. Except for this, the system 20 according to the present embodiment has the same configuration as the system 10 according to the first embodiment and can be described with reference to the description of the system 10 according to the first embodiment.

In the system 20 according to the present embodiment, the communication wire C includes the input communication wire C1 and the output communication wire C2. However, in the system 20 according to the present embodiment, the number of communication wires C may be one. In this case, the communication wire C may be, for example, a bidirectionally communicable communication wire.

Next, a method for lighting the flashlights $A_1$ to $A_n$ using the system 20 according to the present embodiment will be described.

First, in the same manner as in the system 10 according to the first embodiment, the traffic control device D sends an activating signal, and in the lighting control devices $B_1$ to $B_n$, the controlling unit $b2_n$ activates the activating unit $b3_n$ after the elapse of $T_s \times n$ seconds from the reception of the activating signal. Thus, the activating units $b3_1$ to $b3_n$ are activated sequentially.

Next, the traffic control device D simultaneously sends a lighting signal to the lighting control devices $B_1$ to $B_n$ via the communication wire C. The number of times of sending the lighting signal from the traffic control device D may be one or multiple times, and however, the latter is preferable. In the latter case, it is preferable that the traffic control device D repeatedly sends the lighting signal for a time period specified by a user such as an air traffic controller at a predetermined time interval $T_f$, for example. The predetermined time interval $T_f$ is, for example, about 500 milliseconds.

Next, the receiving units $b1_1$ to $b1_n$ of the lighting control devices $B_1$ to $B_n$ receive the lighting signal sent by the traffic control device D. When the receiving units $b1_1$ to $b1_n$ receive the lighting signal, the controlling units $b2_1$ to $b2_n$ turn ON the power supply units $b4_1$ to $b4_n$ on the basis of the time condition from the reception of the lighting signal to the turning ON of the power supply units $b4_1$ to $b4_n$, set for the flashlights $A_1$ to $A_n$, respectively. When respective power supply units $b4_1$ to $b4_n$ are turned ON, the flashlights $A_1$ to $A_n$ are lit. As a specific example, the time condition for the controlling unit $b2_n$ is a time condition where the power supply unit $b4_n$ is turned ON after the elapse of $T_p \times n$ seconds from the reception of the lighting signal. When the predetermined time interval $T_p$ is about 17 milliseconds, the flashlights $A_1, A_2, [\ldots], A_n$ are lit after the elapse of about 17 milliseconds, about 34 milliseconds, [ . . . ], about 17×n milliseconds from the reception of the lighting signal, respectively. The flashlights $A_1$ to $A_n$ are arranged linearly such that the flashlight $A_1$ is arranged at an end on the side opposite to an approach direction for the aircraft relative to an end at an approach entrance for the aircraft in the runway, and the flashlight $A_n$ is arranged at the end on the approach entrance side of the runway. Therefore, in the case where a pilot of the aircraft sees the flashlights $A_1$ to $A_n$, the flashlights $A_1$ to $A_n$ are lit sequentially at a time interval of about 17 milliseconds along an approach direction for the aircraft (an direction indicated by the arrow AD).

As described above, in the system 20 according to the present embodiment, flashlights $A_1$ to $A_n$ are lit after the reception of the lighting signal sent by the traffic control device D on the basis of the time condition for the controlling units $b2_1$ to $b2_n$ of the lighting control devices $B_1$ to $B_n$ in an activated state of the activating units $b3_1$ to $b3_n$, respectively. In the existing chained flashlight system, a communication wire is provided for each lighting control device to individually send a lighting signal to each lighting control device by the traffic control device. However, the system 20 according to the present embodiment is not required to provide a communication wire for each lighting control device and thus can be provided at lower cost. In addition, the system 20 according to the present embodiment can reduce the number of existing communication wires to, for example, one while using the existing communication wire, by connecting one of the existing communication wires to all the lighting control devices $B_1$ to $B_n$, for example.

In the system 20 according to the present embodiment, the abnormality sensing units $b5_1$ to $b5_n$ may detect, for example, an abnormality of at least one unit selected from the group consisting of flashlights $A_1$ to $A_n$, the receiving units $b1_1$ to $b1_n$, the controlling units $b2_1$ to $b2_n$, the activating units $b3_1$ to $b3_n$, and the power supply units $b4_1$ to $b4_n$ in the state before sending the lighting signal. As described above, by sensing an abnormality in the state before sending the lighting signal, flashlights $A_1$ to $A_n$ and the lighting control devices $B_1$ to $B_n$ can be replaced before using the flashlights $A_1$ to $A_n$, for example. Accordingly, the system 20 according to the present embodiment can improve maintainability.

The present invention has been described so far with reference to the embodiments but the present invention is not limited to the foregoing embodiments. Various modifications on the configuration and details of the present invention that are understandable by a person skilled in the art are possible within a scope of the present invention.

(Supplementary Notes)

Some or all of the above-described embodiments and examples may be described as, but are not limited to, the following Supplementary Notes.

(Supplementary Note 1)

A chained flashlight system, including:

multiple flashlights;

multiple lighting control devices that control lighting of the respective flashlights, a communication wire; and a traffic control device, wherein each lighting control device includes: a receiving unit; a controlling unit; an activating unit; and a power supply unit, the lighting control devices are coupled to the traffic control device by the same communication wire, the traffic control device simultaneously sends an activating signal to the lighting control devices via the communication wire, the receiving unit of each lighting control device receives the activating signal, the controlling unit of each lighting control device activates the corresponding activating unit on the basis of a time condition from reception of the activating signal to activation of the activating unit, set for the corresponding flashlight, and when the power supply unit of each lighting control device is turned ON in an activated state of the corresponding activating unit, the corresponding flashlight is lit by a lighting signal from the traffic control device.

(Supplementary Note 2)

The chained flashlight system according to Supplementary Note 1, wherein the controlling unit of each lighting control device turns ON the corresponding power supply unit in an activated state of the corresponding activating unit on the basis of the lighting signal from the traffic control device.

(Supplementary Note 3)

The chained flashlight system according to Supplementary Note 1 or 2, wherein the traffic control device simultaneously sends a lighting signal to the lighting control devices via the communication wire.

(Supplementary Note 4)

The chained flashlight system according to any one of Supplementary Notes 1 to 3, wherein the controlling unit of each lighting control device turns ON the corresponding power supply unit on the basis of a time condition from reception of the lighting signal to turning ON of the power supply device, set for the corresponding flashlight, in an activated state of the corresponding activating unit.

(Supplementary Note 5)

The chained flashlight system according to any one of Supplementary Notes 1 to 4, wherein the communication wire is capable of sending the lighting signal from the traffic control device to the lighting control devices and is a bidirectional communication wire capable of feeding back information from the lighting control device to the traffic control device, and the lighting control devices are coupled to the traffic control device by the communication wire.

(Supplementary Note 6)

The chained flashlight system according to any one of Supplementary Notes 1 to 5, further including:

a power supply device; and a power supply wire, wherein the lighting control devices are coupled to the power supply device by the same power supply wire.

(Supplementary Note 7)

The chained flashlight system according to Supplementary Note 6, wherein the power supply wire is of a single-phase two-wire type.

(Supplementary Note 8)

The chained flashlight system according to any one of Supplementary Notes 1 to 7, wherein the flashlights are LED flashlights.

(Supplementary Note 9)

The chained flashlight system according to any one of Supplementary Notes 1 to 8, wherein the traffic control device further simultaneously sends a luminous intensity designation signal to the lighting control devices via the communication wire, the receiving unit of each lighting control device receives the luminous intensity designation signal, the controlling unit of each lighting control device turns ON the corresponding power supply unit such that luminous intensity of the corresponding flashlight during an ON-state of the power supply unit becomes luminous intensity specified by the luminous intensity designation signal, and when the power supply unit if each lighting control device is turned ON, the corresponding flashlight is lit so as to have luminous intensity specified by the luminous intensity designation signal.

(Supplementary Note 10)

The chained flashlight system according to any one of Supplementary Notes 5 to 9, wherein each lighting control device further includes an abnormality sensing unit, the abnormality sensing unit of each lighting control device detects an abnormality of at least one unit selected from the group consisting the corresponding flashlight, the corresponding receiving unit, the corresponding controlling unit, the corresponding activating unit, and the corresponding power supply unit and sends an abnormal signal to the traffic control device via the communication wire.

(Supplementary Note 11)

The chained flashlight system according to any one of Supplementary Notes 1 to 10, wherein each flashlight further includes a heater, the chained flashlight system further includes heater control devices that control heating of the respective flashlights, each heater control device includes: a heater receiving unit; a heater controlling unit; and a heater power supply unit, the lighting control devices are coupled to the traffic control device by the same communication wire, the traffic control device simultaneously sends a heating signal to the heater control devices via the communication wire, the heater receiving unit of each heater control device receives the heating signal, the heater controlling unit of each heater control device turns ON the corresponding heater power supply unit, and when the heater power supply unit of each heater control device is turned ON, the corresponding heater of the flashlight is turned on.

(Supplementary Note 12)

The chained flashlight system according to any one of Supplementary Notes 1 to 11, wherein the traffic control device sends 1-bit information in the activating signal for a predetermined pulse signal width.

(Supplementary Note 13)

The chained flashlight system according to Supplementary Note 12, wherein the predetermined pulse signal width is 0.1 to 499.9 milliseconds.

The present application is based upon and claims the benefit of priority from Japanese patent application No. 2017-012998, filed on Jan. 27, 2017, and the entire disclosure of which is incorporated herein its entirety by reference.

INDUSTRIAL APPLICABILITY

The present invention can provide a chained flashlight system capable of reducing a load on a power supply wire and a power supply. Thus, the present invention is really useful in the aeronautical field, for example.

REFERENCE SIGNS LIST

10, 20: chained flashlight system
$A_1, A_2, A_n$: flashlight
AD: approach direction
$B_1, B_2, B_n$: lighting control device
$b1_1, b1_2, b1_n$: receiving unit
$b2_1, b2_2, b2_n$: controlling unit
$b3_1, b3_2, b3_n$: activating unit
$b4_1, b4_2, b4_n$: power supply unit
$b5_1, b5_2,$ and $b5_n$: abnormality sensing unit
C: communication wire
C1: input communication wire
C2: output communication wire
D: traffic control device
E: power supply wire
F: power supply device

The invention claimed is:

1. A chained flashlight system, comprising:

plural flashlights;

plural lighting control devices that control lighting of the respective flashlights, a communication wire; and a traffic control device, wherein each of the plural lighting control devices comprises: a receiving unit; a controlling unit;

an activating unit; and a power supply unit, the plural lighting control devices are coupled to the traffic control device by the communication wire, the traffic control device simultaneously sends an activating signal and a luminous intensity designation signal to the plural lighting control devices via the communication wire, the receiving unit of each of the plural lighting control devices receives the activating signal and the luminous intensity designation signal, the controlling unit of each of the plural lighting control device activates the corresponding activating unit, and the receiving units of the lighting control devices receive the luminous intensity designation signal, the controlling units of the lighting control devices turn ON the power supply units, respectively, such that the luminous intensity of the flashlights during the ON-state of the power supply units becomes luminous intensity specified by the luminous intensity designation signal, and when the power supply units of the lighting control devices are turned ON.

2. The chained flashlight system according to claim 1, wherein
the luminous intensity designation signal is a signal designating a luminous intensity set in advance, the luminous intensity may be set when the traffic control device sends the lighting signal, the flashlights emit flashes with a luminous intensity of high lighting, and when the traffic control device sends the luminous intensity designation signal, the flashlights emit flashes with a luminous intensity of medium lighting or low lighting.

3. The chained flashlight system according to claim 1, wherein
the luminous intensity set in advance is 6000 to 20000 cd as high lighting, 600 to 2000 cd as medium lighting and 100 to 450 cd as low lighting.

4. The chained flashlight system according to claim 1, wherein
the controlling unit of each of the plural lighting control devices activates the corresponding activating unit on the basis of a time condition from reception of the activating signal to activation of the activating unit, set for the corresponding-flashlight.

5. The chained flashlight system according to claim 1, wherein
the controlling unit of each of the plural lighting control devices turns ON the corresponding power supply unit on the basis of a time condition from reception of the lighting signal to turning ON of the power supply device, set for the corresponding flashlight, in an activated state of the corresponding activating unit, and
the communication wire is capable of sending the lighting signal from the traffic control device to the plural lighting control devices and is a bidirectional communication wire capable of feeding back information from the plural lighting control devices to the traffic control device, and
the plural lighting control devices are coupled to the traffic control device by the communication wire.

6. The chained flashlight system according to claim 1, further comprising:
a power supply device; and
a power supply wire, wherein
the plural lighting control devices are coupled to the power supply device by the same power supply wire.

7. The chained flashlight system according to claim 6, wherein the power supply wire is of a single-phase two-wire type.

8. The chained flashlight system according to claim 1, wherein the flashlights are LED flashlights.

* * * * *